(12) United States Patent
Smith et al.

(10) Patent No.: US 12,124,967 B1
(45) Date of Patent: Oct. 22, 2024

(54) APPARATUS AND METHOD FOR GENERATING A SOLUTION

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

(*) Notice: Subject to any disclaimer, the term of this patent is extended or adjusted under 35 U.S.C. 154(b) by 0 days.

(21) Appl. No.: 18/402,361

(22) Filed: Jan. 2, 2024

(51) Int. Cl.
*G06N 5/022* (2023.01)
*G06N 5/01* (2023.01)

(52) U.S. Cl.
CPC .............. *G06N 5/022* (2013.01); *G06N 5/01* (2023.01)

(58) Field of Classification Search
CPC ........ G06N 20/00; G06N 20/10; G06N 20/20; G06N 3/0442; G06N 3/0464; G06N 3/048; G06N 3/088; G06N 3/09; G06N 3/092; G06N 3/126; G06N 5/01; G06N 5/04; G06N 7/01
See application file for complete search history.

(56) References Cited

U.S. PATENT DOCUMENTS

| | | | |
|---|---|---|---|
| 2019/0251359 A1* | 8/2019 | Pranger | G06F 16/784 |
| 2021/0352160 A1* | 11/2021 | Jackson | G06F 16/9577 |
| 2021/0374671 A1 | 12/2021 | Li et al. | |

FOREIGN PATENT DOCUMENTS

| | | |
|---|---|---|
| CN | 109961786 B | 4/2023 |
| WO | 2022142006 A1 | 7/2022 |

* cited by examiner

*Primary Examiner* — Luis A Sitiriche
(74) *Attorney, Agent, or Firm* — Caldwell Intellectual Property Law

(57) ABSTRACT

An apparatus and method for generating a solution, the apparatus including a user interface configured to receive user data, at least a processor communicatively connected to the use interface and a memory communicatively connected to the processor, the memory containing instructions configuring the processor to analyze a user interaction received through the user interface based on the user data, identify a problem as a function of the user interaction, generate a solution based on the user interaction and user data received from the user interface, wherein the solution includes a plurality of resources for addressing the problem, wherein generating a solution includes, training a web crawler configured to retrieve and index a plurality of resources, and track user progress with a solution.

20 Claims, 8 Drawing Sheets

APPARATUS AND METHOD FOR GENERATING A SOLUTION

FIELD OF THE INVENTION

The present invention generally relates to the field of problem solving. In particular, the present invention is directed to an apparatus and method for generating a solution.

BACKGROUND

Current methods of identifying a problem of a user are insufficient. There is a need for a method of optimal recognition of personal attributes of a user that indicate a negative impact.

SUMMARY OF THE DISCLOSURE

In an aspect an apparatus for generating a solution, the apparatus including a user interface configured to receive user data, at least a processor communicatively connected to the use interface and a memory communicatively connected to the processor, the memory containing instructions configuring the processor to analyze a user interaction received through the user interface based on the user data, identify a problem as a function of the user interaction, generate a solution based on the user interaction and user data received from the user interface, wherein the solution includes a plurality of resources for addressing the problem, wherein generating a solution includes, training a web crawler configured to retrieve and index a plurality of resources, and track user progress with a solution.

In another aspect a method for generating a solution, the method including using a user interface configured to receive user data and using a computing device to analyze a user interaction received through the user interface based on the user data, identify a problem as a function of the user interaction, generate a solution based on the user interaction and user data received from the user interface, wherein the solution includes a plurality of resources for addressing the problem, wherein generating a solution includes, training a web crawler configured to retrieve and index a plurality of resources, and track user progress with a solution.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating a solution. In an embodiment, apparatus may be used identify a problem of user during a video conference based on verbal and non-verbal content.

Aspects of the present disclosure can be used to identify a plurality of contributing factors to a problem of a user and identify a main factor of the plurality of contributing factors causing a problem of a user.

Exemplary embodiments illustrating aspects of the present disclosure are described below in the context of several specific examples.

Figure 1:
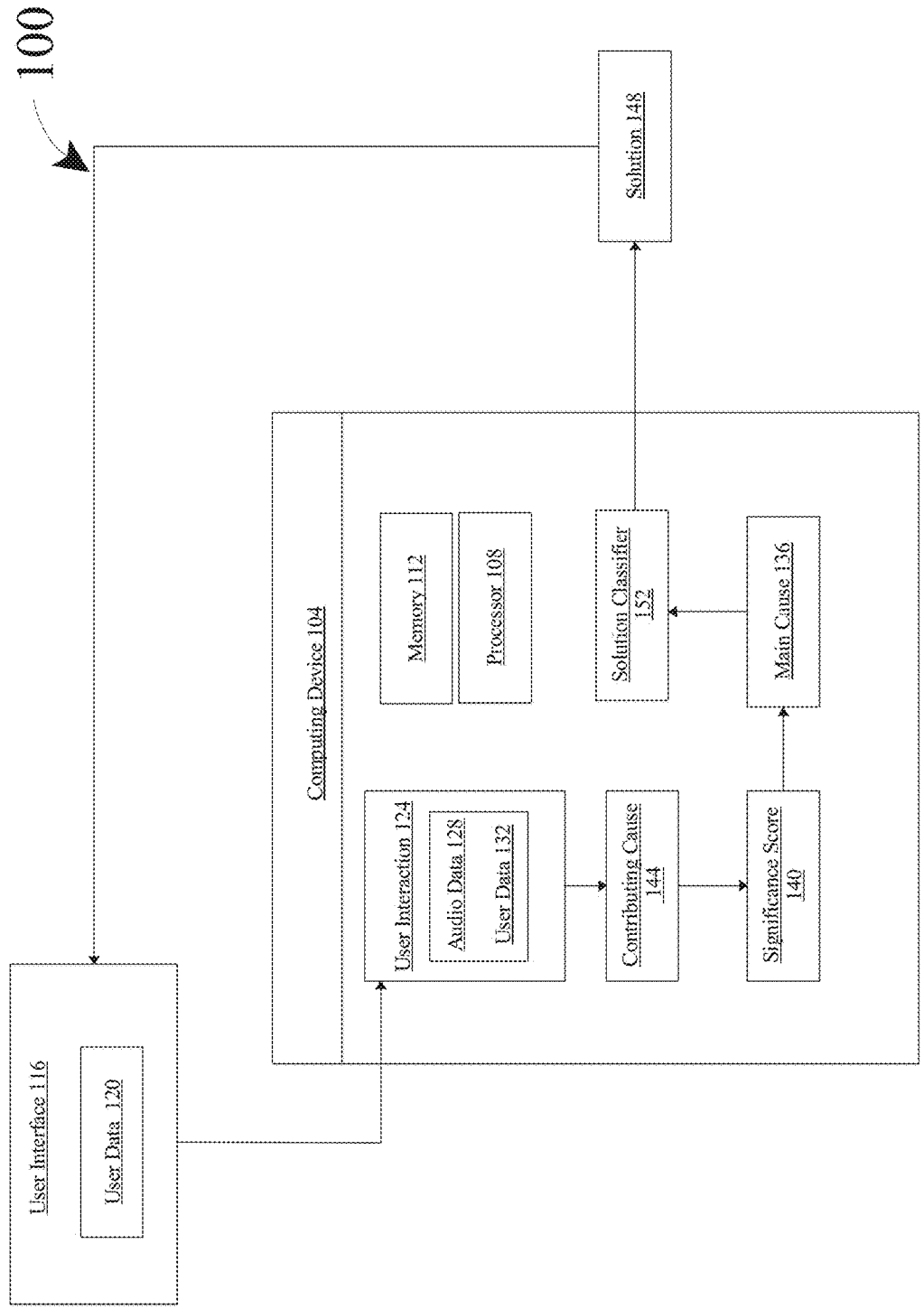
FIG. 1 is a block diagram illustrating an apparatus for generating a solution.

Referring now to FIG. 1, an exemplary embodiment of an apparatus 100 for generating a solution is illustrated. Apparatus 100 includes a computing device 104, containing a processor 108, and a memory 112 communicatively connected to processor 108, memory 112 containing instructions configuring processor 108 to carry out the generating process. Processor 108 may include, without limitation, any processor described in this disclosure. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 includes a user interface 116. A "user interface," as used herein, is a means by which a user and a computer system interact; for example through the use of input devices and software. User interface 116 may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface 116 may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface 116 may be directly influenced using graphical control elements such as widgets. A "widget," as used herein, is a user control element that allows a user to control and change the appearance of elements in the user interface 116. In this context a widget may refer to a generic GUI element such as a check box, button, or scroll bar to an instance of that element, or to a customized collection of such elements used for a specific function or application (such as a dialog box for users to customize their computer screen appearances). User interface 116 controls may include software components that a user interacts with through direct manipulation to read or edit information displayed through user interface 116. Widgets may be used to display lists of related items, navigate the system using links, tabs, and manipulate data using check boxes, radio boxes, and the like.

Still referring to FIG. 1, user interface 116 may be configured to connect and/or allow an interaction between a user and computing device 104, and an interaction between a user and plurality of users. A "user," as used herein, is a person. For example, user interface 116 may be commutatively connected to a plurality of user devices configured to transmit and receive a video input and audio input as described below. User device may contain a camera, display screen microphone, and the like. A "user device," as used herein, is a computing device operated by user. A user device may be a computing device, such as a laptop, smart phone, and the like. In some embodiments, user interface 116 may include a video streaming system configured to connect a plurality of users through live video. A "video streaming system," as used herein, is a system to allow a video conference. A "video conference," as used herein, the two-way or multipoint reception and transmission of audio and video signals by people in different locations for real time communication. The video streaming system (VSS) may include video input. A video input may refer to a video signal or image data received from at least a camera of a user device. The VSS may include an audio input. An audio input may refer to audio signal received from at least a microphone of a user device. The VSS may receive a video input and audio input and transmit the signals to a plurality of user devices. The VSS may include a Codec. A "codec," as used herein, a computer program that encodes or decodes a data stream or signal. The codec may include a software-based coder-decoder technology that compresses analog video and audio input into digital packets and decompresses the data on the receiving end.

Still referring to FIG. 1, user interface 116 is configured to receive user data 120. "User data," as used herein, is information related to a user. User data 120 may include information identifying a user. For example, user data 120 may include information related to a user's name, age, location, hobbies, business problems, career problems and the like. User data 120 may include audio data 128. "Audio data," as used herein, is verbal content received through an audio input. Verbal content may include speech/language spoken by user. For example, audio data 128 may include phrases, words, numbers, and the like verbally spoken by a user. User data 120 may include video data 132. "Video data," as used herein, is non-verbal content received through a video input and audio input. As such, non-verbal content may include all subtle (and non-subtle) forms of communication which are not conveyed with use of language. Exemplary non-verbal content may include change in intonation and/or stress in a speaker's voice, interjection, and the like. For example, in some cases, non-verbal content may include visual non-verbal content. As used in this disclosure, "visual non-verbal content" is non-verbal content that is visually represented. For example, visual non-verbal content may include expression of emotion, facial recognition, physical gestures, symbols and items displayed through an image, and the like.

Still referring to FIG. 1, in some embodiments, user interface 116 may include a chatbot configured to receive user data 120. As used in the current disclosure, a "chatbot" is a computer program designed to simulate conversation with users, as disclosed further below. For example, a chatbot may be used to ask a user to disclose their hobbies, education, career problems, and the like, wherein a user may respond with text or audio through user interface 116.

Still referring to FIG. 1, user interface 116 is communicatively connected to computing device 104. As used in this disclosure, "communicatively connected" means connected by way of a connection, attachment or linkage between two or more relate which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, computing device 104 may receive user data 120 through a system database communicatively connected to computing device 104. A "system database," as used herein, is a data structure containing information to be used in generating a solution. Databases, as disclosed throughout this disclosure, may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, computing device 104 may be configured to train and utilize a web crawler to retrieve user data 120. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to scrape user data 120 from a plurality of work related, and social media sites, blogs, or forums. The web crawler may be seeded and/or trained with a reputable website, such as user's LinkedIn page, to begin the search. The web crawler may be seeded web sources received using a Chatbot through the user interface 116. For example, a chatbot may ask for all social media pages affiliated with the user. The web crawler may be generated by a processor 108. In some embodiments, the web crawler may be trained with information received from a user through a user interface 116. In some embodiments, the web crawler may be configured to generate a web query. A web query may include search criteria received from a user. Additionally, the web crawler function may be configured to search for and/or detect one or more data patterns. A "data pattern" as used in this disclosure is any repeating forms of information. A data pattern may include repeating personal, financial, career data, and the like. In some embodiments, the web crawler may be configured to determine the relevancy of a data pattern. Relevancy may be determined by a relevancy score. A relevancy score may be automatically generated by processor 108, received from a machine learning model, and/or received from the user. In some embodiments, a relevancy score may include a range of numerical values that may correspond to a relevancy strength of data received from a web crawler function. As a non-limiting example, a web crawler function may search the Internet for user data 120 related to a user. The web crawler may return user data 120, such as, as non-limiting examples, a user's educational data, investment data, pecuniary data, crime data, and the like.

Still referring to FIG. 1, computing device 104 is configured to analyze a user interaction 124 received through the user interface 116 as function of the user data 120. A "user interaction," as used herein, is data related to an interaction of at least a user. An interaction may be conducted through a text based, audio based, video based, or a mix thereof chatting system. In an embodiment, an interaction of a least a user may be conducted through the video streaming system. User interaction 124 may refer to the video data 132 and audio data 128 received from the video and audio inputs by a user during a video conference. For example, computing device 104 may receive audio and visuals of a user speaking during a video conference.

Still referring to FIG. 1, analyzing a user interaction 124 may include computing device 104 identifying and/or analyzing, indexing, categorizing, graphing, and the like, gestures, keywords, phrases, symbols, and the like that indicate a negative effect on a user. A negative effect, also referred to as negative impact in this disclosure, may refer to undesirable, harmful, and/or depressing effect on a user's psychological state. For example, a negative effect may be a sign of sadness or anxiety demonstrated by a user. Computing device 104 may utilize an automatic speech recognition process, facial recognition process, natural language machine-learning model, an image processor, as described further below, to identify/extract such keywords, phrases, and symbols. For example, computing device 104 may identify a user frequently says certain phrases like "unmotivated, "worried," or has a sad demeanor on camera, and the like. In some embodiments, to optimize analyzation of a user interaction 124, computing device 104 and/or the VSS may compress the video input including a video feed/digital video. Videos may be compressed according to a video compression coding format (i.e., codec). Exemplary video compression codes include H.26x codecs, MPEG formats, VVC, SVT-AV1, and the like. In some cases, compression of a digital video may be lossy, in which some information may be lost during compression. Alternatively, or additionally, in some cases, compression of a digital video may be substantially lossless, where substantially no information is lost during compression.

Still referring to FIG. 1, computing device 104 may use a machine vision system to identify non-verbal content that indicates a negative effect on a user. A machine vision system may include at least a camera. The camera may be a camera operating a on user device that is communicatively connected to computing device 104. A machine vision system may use images from at least a camera, to make a determination about a scene, space, and/or object. For example, in some cases a machine vision system may be used for world modeling or registration of objects within a space. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

Still referring to FIG. 1, in some cases, registration may include image processing, such as without limitation object recognition, feature detection, edge/corner detection, and the like. Non-limiting examples of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, the machine vision system may include facial landmark detection. "Facial landmark detection," a used herein, is a machine vision technique that involves identifying and localizing key points or landmarks on a human face. These landmarks may be located at specific positions such as the corners of the eyes, tip of the nose, corners of the mouth, and other important areas of the face. Facial landmark detection may be used in facial analysis tasks, such as facial expression recognition, face alignment, face tracking, and facial pose estimation. By detecting these landmarks, machine vision algorithms may accurately locate and track different parts of the face, which may then be used to recognize facial expressions or to estimate the pose and orientation of the face.

Still referring to FIG. 1, the machine vision system may be used to track facial movement and facial expressions from video data 132 correlated to a user to identify a negative impact. For example, the facial landmark detected by the machine vision system may be inputted into a machine-learning model, such as a classifier to classify a facial landmark to a positive, neutral or negative impact. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A facial classifier may be trained using a facial training dataset including a plurality of facial landmarks correlated to a plurality of impacts. For example, a frown may be correlated to a negative impact, a smile may be correlated to a positive impact, and a blank stare may be correlated to a neutral impact. The facial training dataset may include images or videos of a plurality of facial landmarks received from the system database. In some embodiments, computing device 104 may use/work in tandem with the machine vision system to track the number and/or type of changes in facial landmarks over time during a user interaction 124/video conference, wherein processor 108 may additionally assess correlating audio. For example, video data 132 may include a plurality of timestamps, wherein a timestamp is a digital record of the time of occurrence of a particular event. Processor 108 may use a plurality of timestamps to identify a pattern in user data by correlating a negative indicator/impact to the verbal content based on the timestamp. For example, processor 108 may identify a change in a user's smile to a frown 5 minutes into the video conferee, a second change in a user's frown to smile 10 minutes into the video conference, and the like. Processor 108 may identify speech spoken by or to the user during recognition of a facial landmark. For example, if a user begins to frown during a video conference, processor 108 may identify the verbal content spoken before or during a user frowning and categorize it as a contributing cause to problem as described further below. In another example, processor 108 may determine that a user displayed a dreadful facial expression in response to audio about job layoffs.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may include generating a first vector output containing a data entry cluster, generating a second vector output containing an input data, and calculating the distance between the first vector output and the second vector output. This may include using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent;

however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a $$\text{Pythagorean norm: } l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, analyzing a user interaction 124 may include using a language processing model trained to identify/extract keywords and phrases from text-based user data 120. For example, a user may submit, during a video conference, user data 120 in the form of a text submission through a chatbot or an upload of documents and photos. A language processing model may be trained with data correlating keywords, phrases, symbols, and the like to a negative, neutral, or and/or positive impact. For example, a user may upload diary entries, wherein the language processing model may correlate phrases in the diary such as "scared," "helpless," and the like to a negative impact.

Still referring to FIG. 1, language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing model may include a program automatically generated by computing device 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface 116, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, analyzing a user interaction 124 may include using an automatic speech recognition process to identify audio of a user's voice. In some embodiments, an automatic speech recognition process may be used for emotion detection, such as using acoustic features like pitch, tone, and intensity of speech to infer emotions of a user. Computing device 104 may also use machine learning algorithms trained on large datasets of labeled emotional speech to learn patterns and identify emotions correlated to negative, neutral, and/or positive impact as described above. In some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by computing device 104. Computing device 104 may then train an automatic speech recognition model according to training data which includes audible verbal content correlated to known content. In this way, computing device 104 may analyze a person's specific voice and train an automatic speech recognition model to the person's speech, resulting in increased accuracy. Alternatively or additionally, in some cases, computing device 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed herein. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, computing device 104 is configured to identify a problem as a function of the user interaction 124. A "problem," as used herein, is an issue resulting in a negative impact on a user. A problem may include a main cause and a contributing cause for a negative impact on user. A "main cause," as used herein, is a cause that contributes the most to a problem. For example, a problem may be that a user is distressed because they are unemployed while main cause 136 of the problem is that the user does not know what kind of work they should do with their college degree. Identifying a problem of user may include identifying a pattern in user data 120 indicating negativity. A pattern may refer to similar indicators of negative impact in audio data 128, video data 132, and text based submission. For example, a pattern may be that user always frowns at the mention of retirement, has a defensive tone when speaking on their finances, and submits user data 120 showing a negative balance in their bank account. Identifying a pattern may include methods as described further below, such as identifying and scoring a plurality of contributing causes 144. A "contributing cause," as used herein, is a cause that contributes to a problem. For example, a contributing cause 144 may be that a user is financially suffering while searching for employment. In order to determine main cause 136, computing device 104 may perform classification and scoring methods on the plurality of contributing causes 144 to output a main cause 136 as described further below. A main and/or contributing cause may be identified from the outputs of the language model, facial classifier, voice speech recognition, machine vison system, and the like as described above. For example, computing device 104 may take the classified facial landmarks, keywords, phrases, and the like from verbal and nonverbal content that give an indication of a negative impact on the user and categorize them as contributing causes 144. A plurality of contributing causes 144 may relate and/or depend on the main cause 136. In some embodiments, in determining a problem, computing device 104 may identify a plurality of contributing causes 144 and score and/or weigh each contributing cause 144 against a significance threshold to identify one or more main causes 136.

Still referring to FIG. 1, computing device 104 may generate a significance score 140 for each contributing cause 144 identified. A "significance score," as used herein, is a score related to the negative impact that a contributing cause 144 has on a user. The significance score 140 may be linguistic score generated using fuzzy sets as described further below. For example, the significance score 140 may be labels such as "overarching," "subsidiary," "high," "low," "average," and the like. In some cases, the significance score 140 may include a numerical value, such as a percentage or a value on a numerical scale indicating the negative impact on a user. In regard to a numerical value, a low value may indicate a low negative impact on a user, whereas a high value may indicate a high negative impact on a user. The significance score 140 may be based on the number of indicators of a negative impact identified by computing device 104. For example, the significance score 140 may be based on the number of facial landmarks detected of a user showing distress, or the number of times a user mentions keywords such as "unhappy," "unfulfilled," "sad," and the like when discussing a contributing cause 144/topic. Computing device 104 may use a machine-learning process, and/or a computational algorithm as described throughout this disclosure to generate a significance score 140. For example, algorithms may include linear regression, logistic regression, decision trees, and neural networks. For example, a significance score machine-learning model may configured to receive a contributing cause as an input and output a significance score, wherein the model is trained with significance score training data correlating a plurality of contributing causes to significance scores.

Still referring to FIG. 1, a "significance threshold," as used herein, is a value used to make a decision based on a significance score. The significance threshold may be a linguistic or numerical value set as the standard for determining if a contributing cause 144 is a main cause 136 based on the significance score 140. A "linguistic variable," as used herein, is a variable whose values are not numbers, but words or sentences in a natural language. For example, the significance threshold may be that a contributing cause 144 must score 70% or higher to be identified as a main cause 136. Computing device 104 may weigh/compare each significance score 140 of contributing cause 144 using computational methods as described above. In some embodiments, comparing a significance score 140 to a significance threshold may include using interference engine as described further below. Wherein the significance score 140 is a linguistic variable, the significance threshold may be linguistics as well. For example, the significance threshold may be that a contributing cause 144 must have correlated to a "high" number of distressful facial landmarks and an "average," number of negative keywords in order to be identified as a main cause 136. In some embodiments, computing device 104 may use an inference engine to compare a linguistic significance score 140 to a linguistic significance threshold. For example, using a fuzzy set inference system, a contributing cause 144 fuzzy set may be compared to a main cause 136 related fuzzy sets, such as a facial landmark fuzzy set, keyword fuzzy set, and the like that identity requirements, such as patterns within user data 120, for a main cause 136 classification, wherein the significance score 140 may be a linguistic variables as described above. An inference engine of the fuzzy set system may determine based on the linguistic variables the classification of a contributing cause 144 to a main cause 136.

Still referring to FIG. 1, computing device 104 may be configured to classify a main cause 136 to a problem category. A "problem category," as used herein, is a classification to which a type of problem belongs. Problem categories may include career, finance, personal, love, health, and the like, wherein a main cause 136 is based on that category. For example, a main cause 136 related to financial budgeting issues may be classified to a finance problem category. Computing device 104 may train and use a problem classifier configured to receive, one or more main causes 136 as inputs and output one or more main causes 136 matched to a problem category. Problem classifier may be trained using a problem training dataset containing data correlating a main cause to a problem category. Training datasets as disclosed herein may be received from system database as described above.

Still referring to FIG. 1, computing device 104 is configured generate a solution 148 based on the user interaction 124 and user data 120 received from the user interface 116, wherein generating a solution 148 includes training a web crawler configured to retrieve and index a plurality of resources. A "resource," as used herein, is information that may be used to address a problem. A "solution," as used herein, is one or more resources categorized to a problem. A solution 148 may include a plurality of resources for solving or addressing a problem. Resources may be digital, for example, websites, virtual courses, forums, eBooks, and the like. Computing device 104 may train a web crawler, as described above, to retrieve and index a plurality of resources into system database. A web crawler may be seeded with websites sites, such as online therapy platforms, life coach homepages, educational courses, and the like. A web crawler may be configured to receive and index resources based on specific main causes 136 or contributing causes 144 of a problem. For example, instead of retrieving general solutions 148 to generally address finance budgeting problems, the web crawler may be trained to retrieve resources that address financial budgeting problems for a gambling addict located in Massachusetts. The web crawler may receive the main cause 136 of problem as an input and be seeded with narrow references to start the search for such a specific plurality of resources. In some embodiments, identified and/or generated, problems, main causes, contributing causes, solutions, and the like by apparatus 100 may be stored and received from the system database. In some embodiments, solution 148 may be retrieved from the system database.

Still referring to FIG. 1, generating a solution 148 may include using a solution classifier 152 configured to receive one or more main causes 136 as an input and output one or more solutions 148. A solution training dataset may contain data correlating main causes to solutions. In some embodiments, classification of a main cause 136 to a solution 148 may include the problem category as disclosed above. For example, the problem category may be an additional input wherein the training data for the solution classifier 152 contains data correlating a financial problem category based main cause 136 to a financial problem category based solutions 148. In some embodiments, the solution classifier 152 may output a plurality of solutions 148 matched to a main cause 136, wherein the computing device 104 may rank the plurality of solutions 148 in order of compatibility to user data 120 of a user. Compatibility may be based on a solution 148 correlating with the interests, hobbies, personality traits, education, careers path, skills, and the like of a user received from user data 120. Rankings may identify from a least compatible solution 148 to a most compatible solution 148 to user data 120. Computing device 104 may rank a plurality of solutions 148 using a machine-learning process, such as a machine-learning model as described throughout this disclosure. For example, ranking algorithms may include linear regression, logistic regression, support vectors, and the like.

Still referring to FIG. 1, in some embodiments, in generating solution 148, computing device 104 may classify a plurality of solutions/resources previously generated or received to a plurality of corresponding problem categories. Computing device 104 may store and index these matches in system database for look-up or classification purposes, such as generating a new solution 148. For example, computing device 104 may take data gathered from the web crawler and store it as potential solutions in system database. In another example, computing device 104 may take the output of the problem classifier and pick a solution categorized to the same problem category. In picking the solution computing device 104 may use a machine-learning model, such as a solution classifier to match user data elements, such as age, location, personality, and the like, to the most corresponding solution classified to that problem category. The solution classifier may be trained with a training data set containing data correlating elements of user data to a one or more solutions. In some cases, the training data may include a compatibility description, wherein elements of user data are correlated to a one or more compatibility descriptions of one or more solution. A "compatibility description," as used herein, is information describing compatible elements of a user. For example, a compatibility description may be that for a solution suggesting the attendance to a class in a recreation center, compatible or ideal elements in user data may be that a user does not work during the offered class times, has transportation, is not suffering from social anxiety, and like. Compatibility descriptions of a solution may be received from system database and from a web crawler as described above. For example, a web crawler may index the class requirements/eligibility webpage into system database.

Still referring to FIG. 1, computing device 104 may display a ranked plurality of solutions 148 to a user through user interface 116. In some embodiments, computing device 104 may use a chatbot to receive user feedback back on the solutions 148 provided, the ranking, and the like. Computing device 104 may receive user feedback through the user interface, system database, and the like. In the case of dissatisfaction with the solutions 148 or ranking, by the user, computing device 104 may request and receive amendments or suggestions from the user regarding solutions 148 and/or ranking through the chatbot. Computing device 104 may incorporate the user feedback, including the amendments and suggestions, in any machine-learning process or computational algorithm uses to generate a solution 148 as described above, and reproduce and display an updated solution 148(s) and/or ranking. Incorporating the user feedback may include updating a training data set, such as a financial problem/solutions training data set for solution classifier 152, by removing or adding correlations of user data and main causes to a solution or resources as indicated by the feedback. For example, user feedback may indicate a solution related to creating an emergency savings fund does not correlate to a financial problem category, wherein the main cause of the problem is unemployment. Based on this feedback, computing device 104 may remove such a correlation from the training data set used for correlations between financial problems and financial solutions in regard to the type of main cause or user data. Any machine-learning model as described herein may have the training data updated based on such feedback or data gathered using a web crawler as described above.

With continued reference to FIG. 1, computing device 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; computing device 104 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Still referring to FIG. 1, computing device 104 is configured to track user progress based on the solution 148. A user may select a solution 148 or multiple solutions 148 to engage in, wherein computing device 104 may receive user feedback regarding progress. User feedback may be received through user interface 116 using the chatbot, submission of data, and the like. For example, if a solution 148 to an education problem category based main cause 136 was to complete an educational course, computing device 104 may receive one or more documents demonstrating a user's progress, such as course registration, grades, completion certificate, and the like. In the case of lack of progress, computing device 104 may receive user feedback describing issues, problems, negativity, and the like experienced by the user engaging in the solution 148. For example, user feedback may be that the user finds the course too difficult and does not understand the material. Computing device 104 may train and use an adjustment classifier configured to receive user feedback as an input and output a mini key. A "mini key," as used herein, is a means for addressing a lack in user progress in regard to a solution 148. For example, a mini-key to education problem category based solution 148, wherein user feedback described a user having difficulty understanding the material, may include resources such as study tools, tutor information, and the like. An adjustment classifier training dataset may include data correlating user feedback to mini keys. In some embodiments, if a plurality of mini keys are outputted, computing device 104 may rank the plurality of mini keys based on compatibility to user data 120 using methods as described above. Computing device 104 may display one or more mini keys through user interface 116. Computing device 104 may receive feedback on min keys and update mini keys using methods as described above.

Still referring to FIG. 1, user feedback and user progress may be used to refine training datasets and retrain machine-learning models as described throughout this disclosure, for example solution classifier 152 may be retrained based on user feedback indicating impracticality of engagement or completion of a solution 148 previously generated. Such feedback may be used to help optimize generation, ranking, and selection of solutions 148 to be displayed and recommended to a user.

Still referring to FIG. 1, in some embodiments, generating solution 148 may include matching a user to a cohort of users who have experienced, are experiencing, have solved, or are trained to help solve the same or a similar problem to the user for communication purposes. For example, solution 148 may include the contact information, digital link to a video conference schedule with one or more users of the cohorts, and the like for a user to engage with. Computing device may match a user to a cohort of users using a cohort classifier configured to receive user data 120 and main cause 136 as inputs and output a match between a user and a cohort of users. The training data may include data correlating user data and main causes to a cohort of users. As a non-limiting example, a user with user data 120 and main cause 136 indicating that they are a 65-year-old user with a gambling problem may be matched to a cohort of user that also experience gambling issues or other impulse control issues who are over the age of 50.

With continued reference to FIG. 1, apparatus 100 may facilitate communication between a user and one or more users. For example, computing device 104 may receive a message, such as audio, text, or graphic based information from a user of the cohorts and display the message for user interaction through a graphical user interface as described above. The user matched to the user of cohorts may be able to respond through the graphical user interface. Messages may include external recourses, such videos, online reading material, digital applications, and the like. The external resources may be digitally attached, for example by a URL, or contained within the message. Communications may include a message from one user to a plurality of user, such as a mass text, email, and the like.

Figure 2:
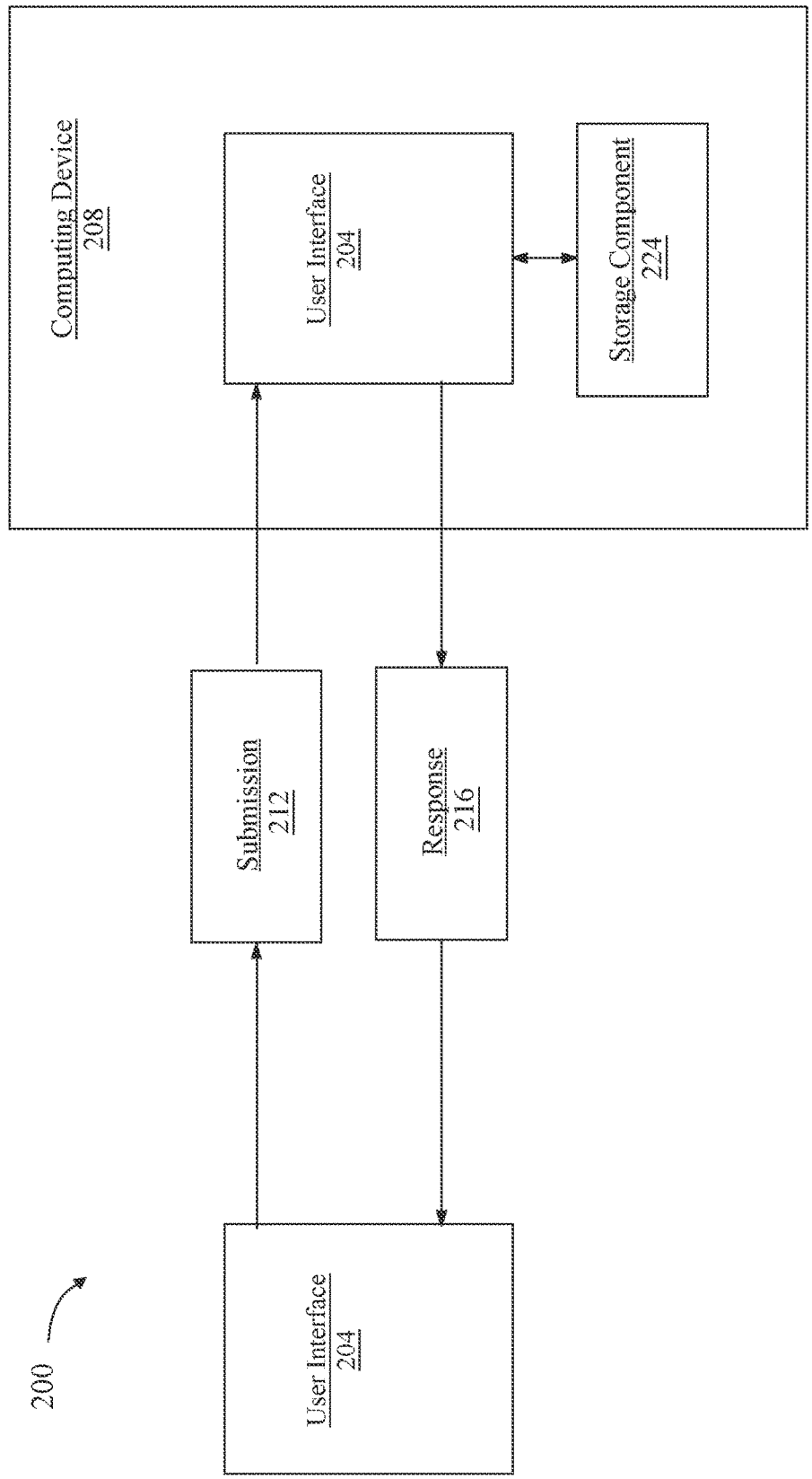
FIG. 2 is a block diagram illustrating a chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device 204 may be used by computing device 108 as an input to another function, such as machine-learning models as described further below.

Figure 3:
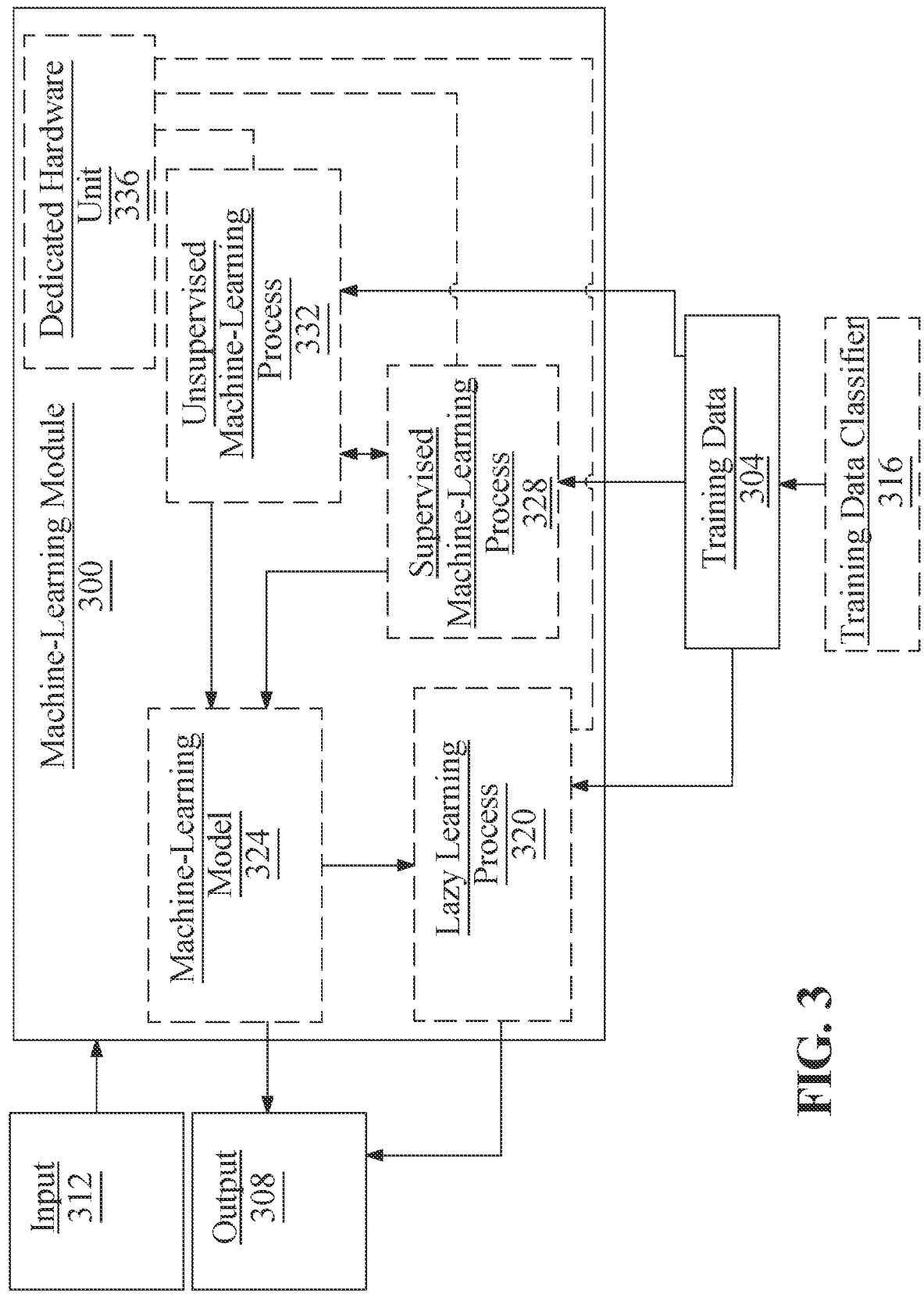
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language. The use of a machine-learning model and/or machine-learning process may improve the functioning of computing device 104 in generating a solution 148. For example, the facial classifier, as described above, improves the performance power of processor 108 by classifying a plurality of facial landmarks to a positive, neutral or negative impact, wherein each impact level provides a categorization of a plurality facial landmarks derived from the machine vision system highlighting a plurality of facial expressions of a user, which is then used by computing device 104 in determining a problem, contributing cause, and main cause as described further below. The quantity of data that goes into generating the impact category/level may vary and fluctuate based on a plurality of variables, such as the quantity of facial landmarks detected of a user and the like. Without the implementation of a machine-learning model, there would be a trade in the performance power of 108, such as time and accuracy, in order to sort the data and generate the impact categories that are then used in a separate classification process, as described further below, in order to generate a solution 148. The ability to continuously train a machine-learning model cable of learning to identify new trends or correlations within a fluctuating quantity of data is a benefit that would not be realized otherwise, without the tradeoff in performance efficiency.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, a facial training dataset including a plurality of facial landmarks correlated to a plurality of impacts.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may in subsets of training data based on a problem category as disclosed above. For example, the problem category may be financial wherein the training data for the solution classifier 152 contains data correlating a financial problem category based main cause 136 to a financial problem category based solutions 148. like. These subs-sets of training data improve the function of processor 108 by optimizing categorization of user data to an output such as an interest level or a contributing cause as described above in generation of a solution 148. Additionally, use of a machine-learning models/classifiers may provide improvement to computing device 104 by enabling the ability to compare and sort a plurality of data into a categories that allow processor 108 to accurately/optimally perform analytical tasks such as generating solution 148 based on the categorization of data as derived through this disclosure.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identify as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry.

Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 332 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 332 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
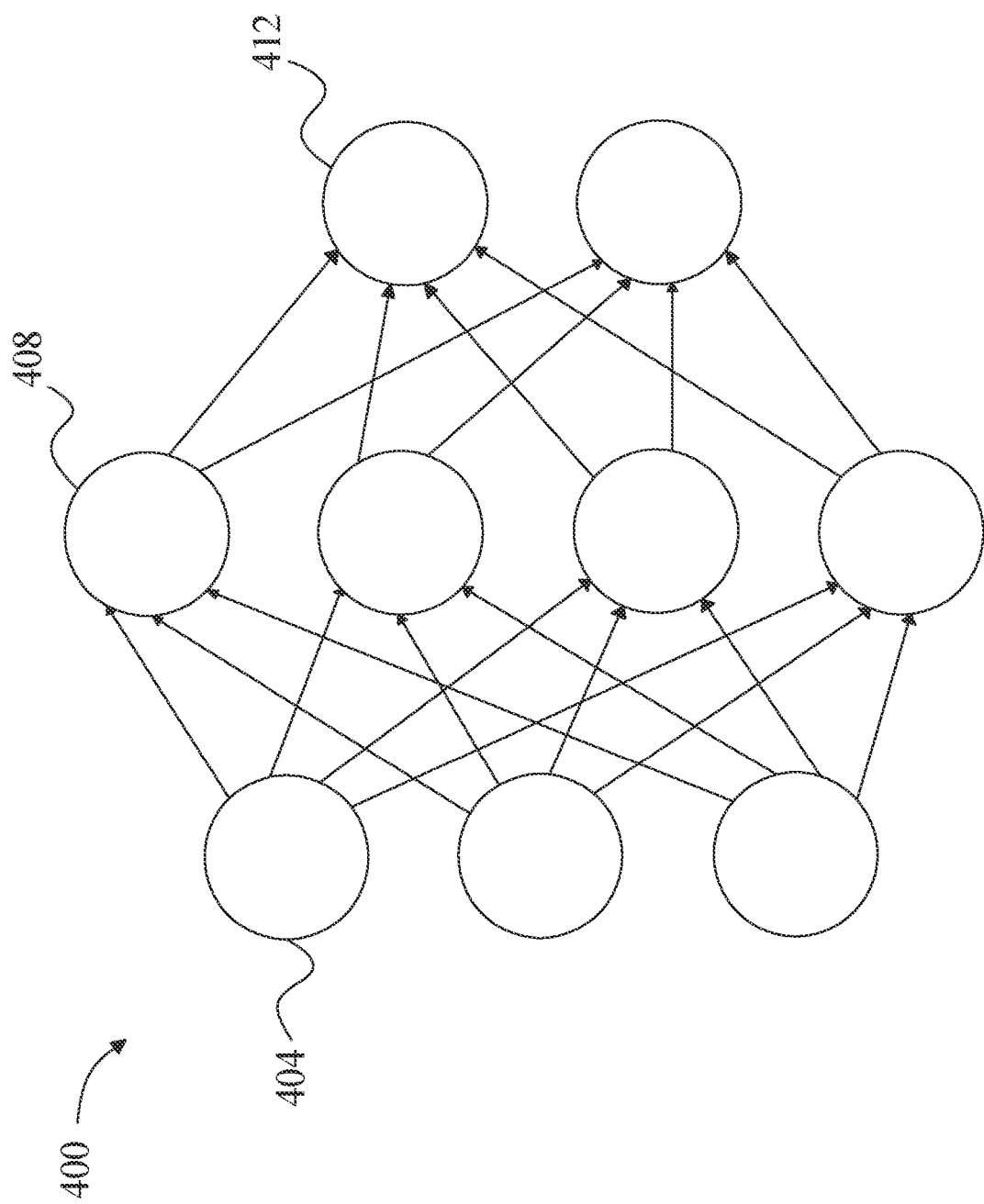
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
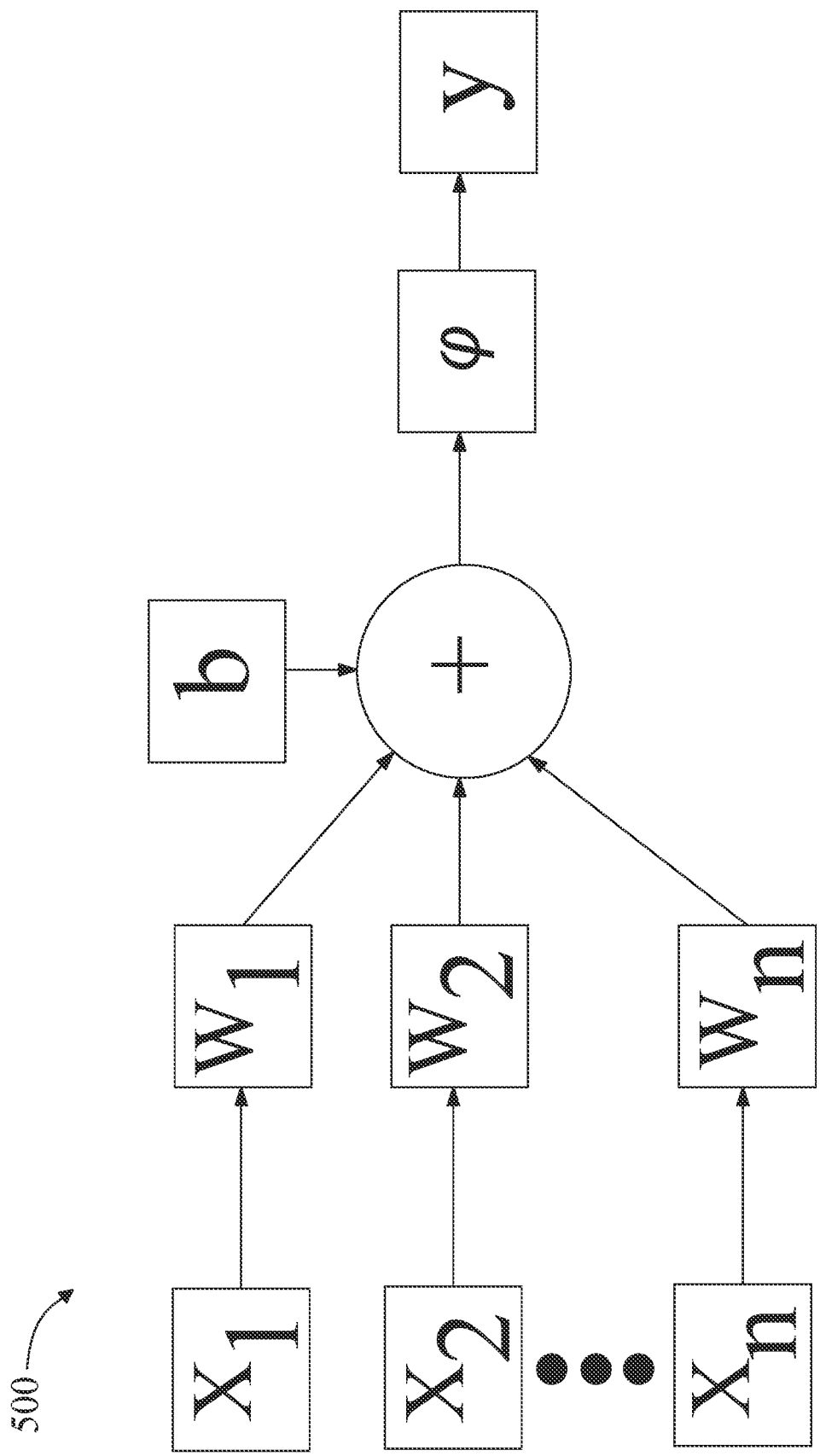
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
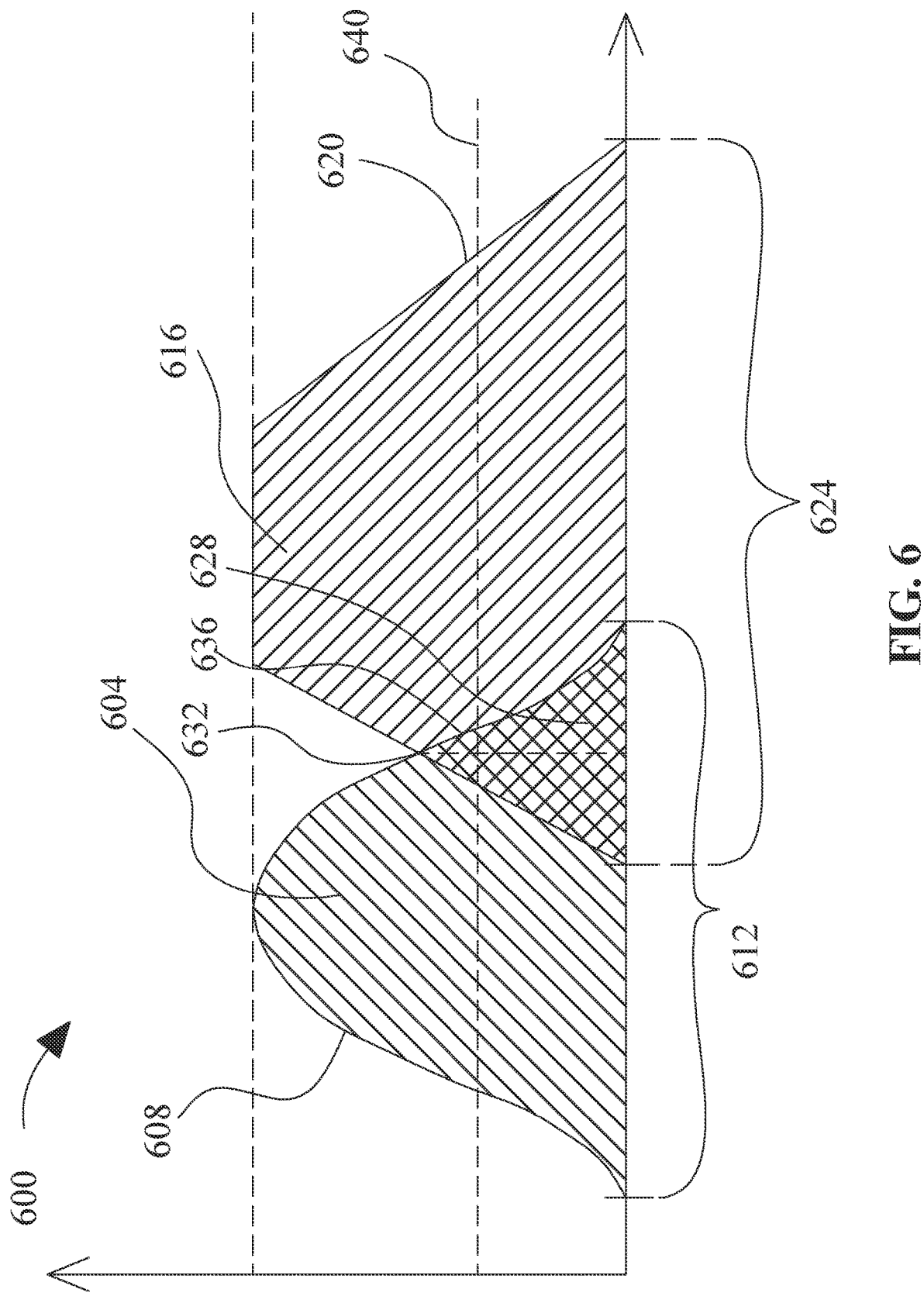
FIG. 6 is a diagram of fuzzy set comparison.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, contributing cause, and a predetermined class, such as without limitation of a main cause class. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or contributing cause and a predetermined class, such as without limitation main cause categorization, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify a contributing cause with a main cause. For instance, if a main cause class has a fuzzy set matching contributing cause fuzzy set by having a degree of overlap exceeding a threshold, computing device 104 may classify the contributing cause as belonging to the main cause categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, an contributing cause may be compared to multiple main cause related categorization fuzzy sets. For instance, contributing cause may be represented by a fuzzy set that is compared to each of the multiple main cause related categorization fuzzy sets; and a degree of overlap exceeding a threshold between the contributing cause fuzzy set and any of the multiple main cause related categorization fuzzy sets may cause computing device 104 to classify the contributing cause as belonging to main cause related categorization. For instance, in one embodiment there may be two main cause related categorization fuzzy sets, representing respectively a facial landmark categorization and a keyword categorization. Facial landmark categorization may have a first fuzzy set; Keyword categorization may have a second fuzzy set; and contributing cause may have a contributing cause fuzzy set. computing device 104, for example, may compare a contributing cause fuzzy set with each of the facial landmark categorization fuzzy set and the keyword categorization fuzzy set, as described above, and classify a contributing cause to either, both, or neither of the facial landmark categorization or in the keyword categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, contributing cause may be used indirectly to determine a fuzzy set, as contributing cause fuzzy set may be derived from outputs of one or more machine-learning models that take the contributing cause directly or indirectly as inputs.

Still referring to FIG. 6, a computing device may use a logic comparison program, such as, but not limited to, a fuzzy logic model to determine a significance score. An significance score may include, but is not limited to, "overarching," "subsidiary," "high," "low," "average," and the like; each such significance score may be represented as a value for a linguistic variable representing significance score in other words a fuzzy set as described above that corresponds to a degree of negative impact as calculated using any statistical, machine-learning, or other method that may occur to a person skilled in the art upon reviewing the entirety of this disclosure. In other words, a given element of contributing cause may have a first non-zero value for membership in a first linguistic variable value such as "high" and a second non-zero value for membership in a second linguistic variable value such as "low" In some embodiments, determining a main cause categorization may include using a linear regression model. A linear regression model may include a machine learning model. A linear regression model may be configured to map data of contributing cause, such as degree of negative impact to one or more main cause related parameters. A linear regression model may be trained using a machine learning process. A linear regression model may map statistics such as, but not limited to, quality of contributing cause degree of negative impact. In some embodiments, determining a main cause of contributing cause may include using a main cause classification model. A main cause classification model may be configured to input collected data and cluster data to a centroid based on, but not limited to, frequency of appearance, linguistic indicators of quality, and the like. Centroids may include scores assigned to them such that quality of degree of negative impact of contributing cause may each be assigned a score. In some embodiments main cause classification model may include a K-means clustering model. In some embodiments, main cause classification model may include a particle swarm optimization model. In some embodiments, determining the main cause of a contributing cause may include using a fuzzy inference engine.

Further referring to FIG. 6, an inference engine may be implemented according to input and/or output membership functions and/or linguistic variables, a significance threshold, and the like. For instance, a first linguistic variable may represent a first measurable value pertaining to contributing cause, such as a degree of negative facial landmarks, while a second membership function may indicate a degree of in negative keywords of a subject thereof, or another measurable value pertaining to contributing cause. Continuing the example, an output linguistic variable may represent, without limitation, a score value. An inference engine may combine rules, such as: "if the negative facial landmark level is 'hard' and the negative keyword level is 'high', the negative impact of the contributing cause score is "overarching", thus classifying the contributing cause as a main cause—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 7:
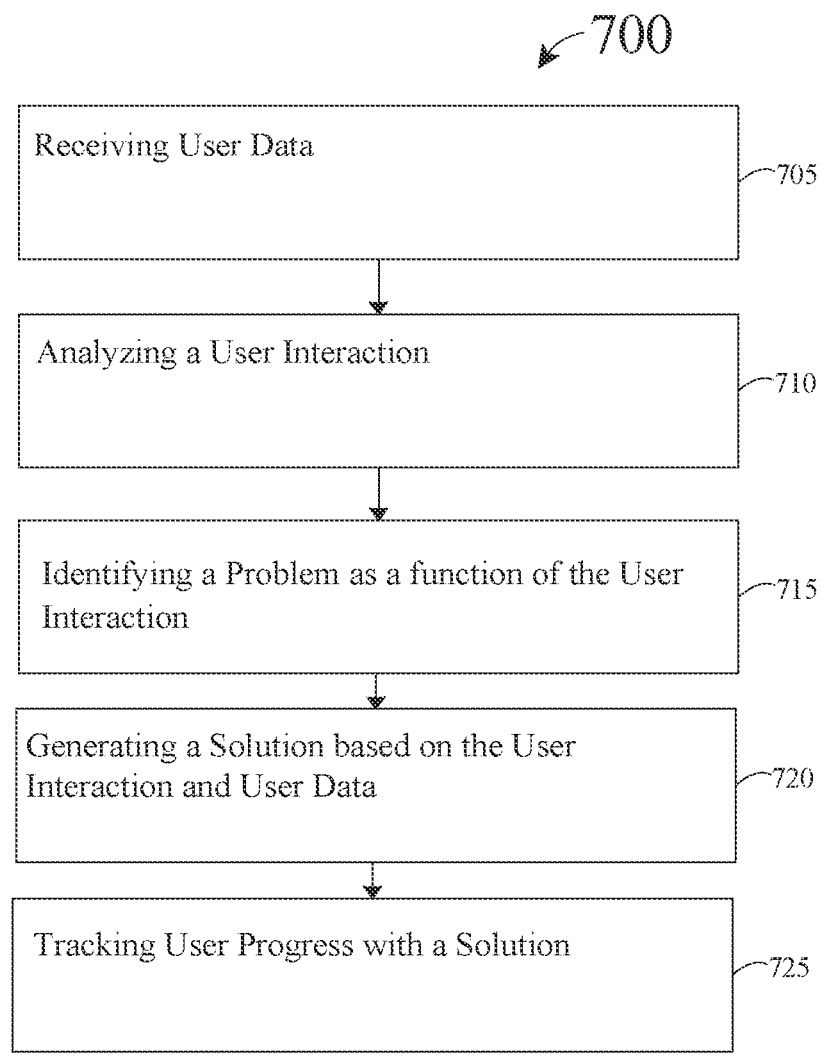
FIG. 7 is a flow diagram illustrating a method of generating a solution.

Referring now to FIG. 7, a flow diagram illustrating a method 700 for generating a solution is illustrated. At step 705, method 700 includes receiving, through a user interface, user data, wherein the user interface is communicatively connected to a computing device, for example, and as implemented in FIGS. 1-7. Receiving the user data further may include using a chatbot though the user interface. Receiving the user data further may include training a web crawler to retrieve user data. The user data may include audio data of a user's voice. At step 710, method 700 includes analyzing, by the computing device, a user interaction received through the user interface based on the user data, for example, and as implemented in FIGS. 1-7. Analyzing the user interaction further may include connecting a plurality of users through live video using a video streaming system operating on the user interface. Identifying the keywords may include utilizing a language model to extract keywords from audio data. wherein analyzing a user interaction may include identifying keywords in user data indicating a problem. Analyzing a user interaction may include using a facial landmark detection technique to classify a facial expression to a positive, neutral, or negative impact. At step 715, method 700 includes identifying, by the computing device, a problem as a function of the user interaction, for example and as implemented in FIGS. 1-7. Identifying a problem may include identifying a pattern in user data indicating negativity. At step 720, method 700 includes generating, by the computing device, a solution based on the user interaction and user data received from the user interface, wherein generating a solution includes training a web crawler configured to retrieve and index a plurality of resources, for example and as implemented in FIGS. 1-7. Generating a solution further may include receiving a solution training dataset including data correlating a main cause to a solution; training a solution classifier using the solution training dataset; and outputting, using the solution classifier, a solution. At step 725, method 700 includes tracking, by the computing device, user progress with a solution, for example, and as implemented in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
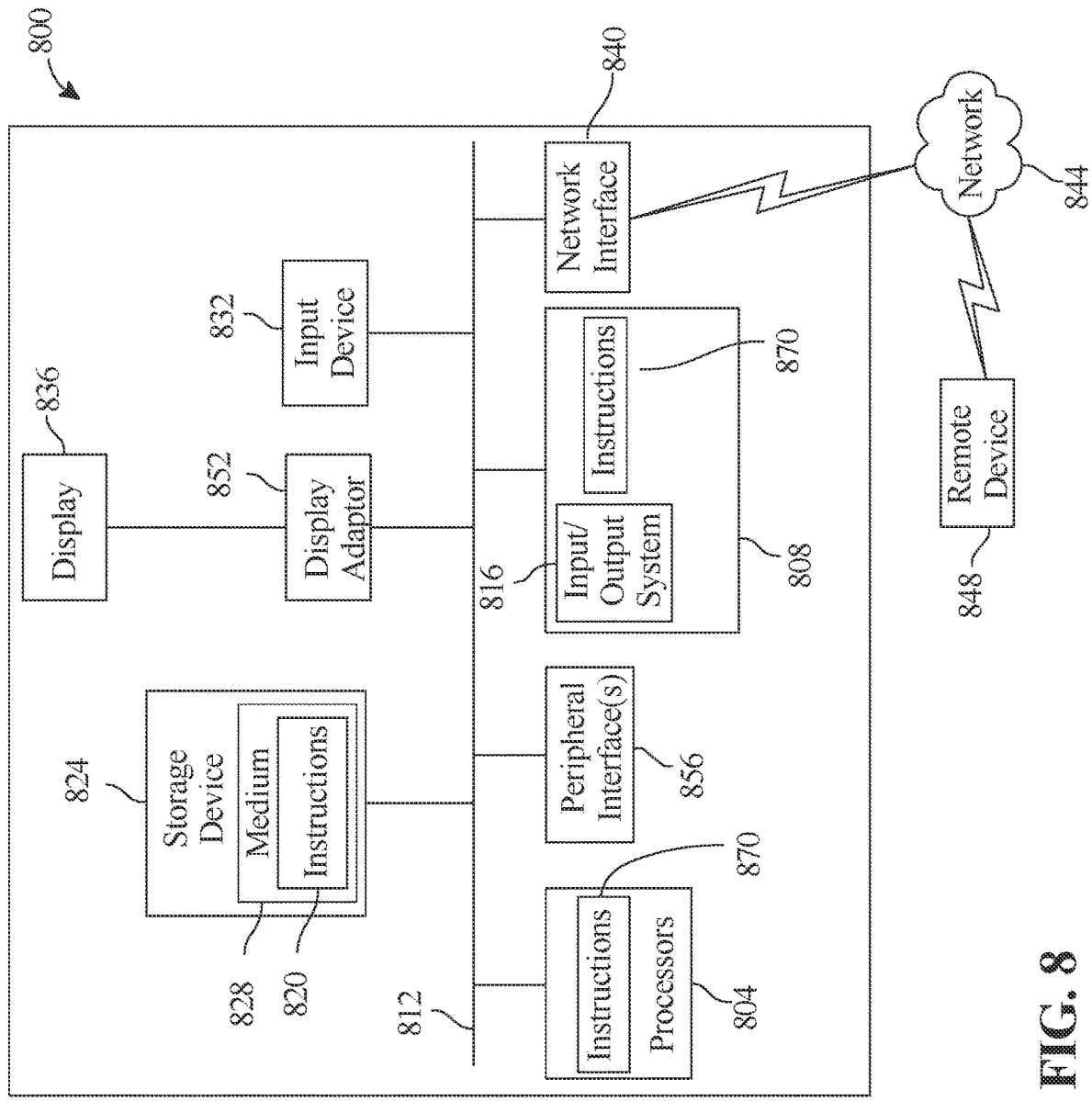
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a solution, the apparatus comprising:
a user interface configured to receive user data;
at least a processor communicatively connected to the user interface; and
a memory communicatively connected to the at least a processor, the memory containing instructions configuring the at least a processor to:
analyze a user interaction received through the user interface based on the user data;
identify a problem as a function of the user interaction, wherein identifying the problem comprises classifying the problem to a problem category, and wherein classifying the problem to the problem category comprises:
training a problem classifier using a problem training dataset, wherein the problem training dataset correlates causes of problems to problem categories;
classifying the problem to the problem category using the trained problem classifier based at least on the user interaction; and
determining an accuracy score, wherein the accuracy score is a numerical value representing the accuracy of outputs of the problem classifier; and
retraining the problem classifier with an additional problem training dataset based at least on the accuracy score;
generate a solution based on the user interaction and the user data received from the user interface, wherein the solution comprises a plurality of resources for addressing the problem, wherein generating the solution comprises training a web crawler configured to retrieve and index a plurality of resources; and track user progress with the solution.

2. The apparatus of claim 1, wherein the at least a processor is configured to utilize a chatbot to receive the user data.

3. The apparatus of claim 1, wherein the user interface comprises a video streaming system configured to connect a plurality of users through live video and receive the user interaction.

4. The apparatus of claim 1, wherein the at least a processor is further configured to retrieve the user data by training a second web crawler to retrieve the user data.

5. The apparatus of claim 1, wherein the user data comprises audio data of a user's voice.

6. The apparatus of claim 1, wherein analyzing the user interaction comprises identifying keywords in the user data indicating the problem.

7. The apparatus of claim 6, wherein identifying the keywords comprises utilizing a language model to extract the keywords from audio data.

8. The apparatus of claim 1, wherein analyzing the user interaction comprises using a facial landmark detection technique to classify a facial expression to a positive, neutral, or negative impact, wherein the negative impact is classified as a contributing cause.

9. The apparatus of claim 1, wherein identifying the problem comprises identifying a pattern in the user data indicating negativity, wherein the pattern comprises similar indicators of a negative impact.

10. The apparatus of claim 1, wherein generating the solution further comprises:
    receiving a solution training dataset comprising data correlating main causes to solutions;
    training a solution classifier using the solution training dataset; and
    outputting, using the solution classifier, the solution.

11. A method for generating a solution, the method comprising:
    receiving, through a user interface, user data, wherein the user interface is communicatively connected to a computing device;
    analyzing, by the computing device, a user interaction received through the user interface based on the user data;
    identifying, by the computing device, a problem as a function of the user interaction, wherein identifying the problem comprises classifying the problem to a problem category, and wherein classifying the problem to the problem category comprises:
       training a problem classifier using a problem training dataset, wherein the problem training dataset correlates causes of problems to problem categories;
       classifying the problem to the problem category using the trained problem classifier based at least on the user interaction; and
       determining an accuracy score, wherein the accuracy score is a numerical value representing the accuracy of outputs of the problem classifier; and
       retraining the problem classifier with an additional problem training dataset based at least on the accuracy score;
    generating, by the computing device, a solution based on the user interaction and the user data received from the user interface, wherein the solution comprises a plurality of resources for addressing the problem, wherein generating the solution comprises:
       training a web crawler configured to retrieve and index a plurality of resources; and
    tracking, by the computing device, user progress with the solution.

12. The method of claim 11, wherein receiving the user data further comprises using a chatbot.

13. The method of claim 11, wherein analyzing the user interaction further comprises connecting a plurality of users through live video using a video streaming system operating on the user interface, wherein the video streaming system is configured to receive the user interaction.

14. The method of claim 11, wherein receiving the user data further comprises training a second web crawler to retrieve the user data.

15. The method of claim 11, wherein the user data comprises audio data of a user's voice.

16. The method of claim 11, wherein analyzing the user interaction comprises identifying keywords in the user data indicating the problem.

17. The method of claim 16, wherein identifying the keywords comprises utilizing a language model to extract keywords from audio data.

18. The method of claim 11, wherein analyzing the user interaction comprises using a facial landmark detection technique to classify a facial expression to a positive, neutral, or negative impact, wherein the negative impact is classified as a contributing cause.

19. The method of claim 11, wherein identifying the problem comprises identifying a pattern in the user data indicating negativity, wherein the pattern comprises similar indicators of a negative impact.

20. The method of claim 11, wherein generating the solution further comprises:
    receiving a solution training dataset comprising data correlating main causes to solutions;
    training a solution classifier using the solution training dataset; and
    outputting, using the solution classifier, the solution.

* * * * *